United States Patent Office 3,185,744
Patented May 25, 1965

3,185,744
PROCESS FOR ISOMERIZING THE DOUBLE BOND OF STRAIGHT CHAIN TERMINAL MONO-OLEFINS
Charles D. Broaddus, Springfield Township, Hamilton County, Ohio, assignor to The Procter & Gamble Company, Cincinnati, Ohio, a corporation of Ohio
No Drawing. Filed Apr. 13, 1962, Ser. No. 187,197
2 Claims. (Cl. 260—683.2)

This invention relates to a novel process for preparing alkenyl organometallic compounds and derivatives thereof and, more particularly, to a process for metalating terminal and non-terminal olefins having six or more carbon atoms with potassium, rubidium and cesium alkyls to obtain, by conversion of the alkenyl reaction products, a mixture of 1- and 3-substituted derivatives, particularly 1- and 3-substituted monocarboxylic acids.

Metalation denotes the replacement of an activated hydrogen atom by a metal to give a true organometallic compound. It is known that an aliphatic derivative of an alkali metal, such as amylsodium or amylpotassium, will metalate certain $\alpha$- and $\beta$-straight-chain and terminal branched-chain alkenes to produce alkenyl alkali metal products which can be carbonated to give alkenyl carboxylic acids. U.S. Patent 2,454,082 teaches that alkyl sodium and alkyl potassium compounds will metalate propene, the butenes, including 2-butene, and 1-pentene, to form alkenyl alkali metal compounds and by carbonation thereof and subsequent acidification, unsaturated carboxylic acids including $\beta$, $\gamma$ unsaturated carboxylic acid. However, no process has heretofore been provided for converting non-terminal olefins of unspecified double bond location and having at least six carbon atoms and terminal olefins having six or more carbon atoms to metalated potassium, rubidium and cesium products which can subsequently be treated to provide a mixture of 1- and 3-substituted derivatives.

Accordingly, it is a principal object of this invention to provide a method for metalating terminal or non-terminal olefins containing at least six carbon atoms in a manner which provides for the production of metalated derivatives having metal substituents on either the 1- or 3-positions in the alkenyl chain.

Another object of this invention is to provide a process to be carried out under selected reaction conditions whereby a potassium, rubidium or cesium alkali metal atom will replace a hydrogen atom of an aliphatic terminal or non-terminal olefin having six or more carbon atoms in the alkene chain to provide a mixture of 1- and 3-substituted organometallic derivatives which mixture can be readily subjected to further reactions to produce highly useful and valuable product mixtures.

Still another object of this invention is the provision of a process for the preparation of potassium, rubidium, and cesium alkenyl intermediates of terminal and non-terminal olefins including and above the hexenes and the conversion of said alkenyl intermediates to a mixture of 1- and 3-substituted monocarboxylic acids, the specific object of such a process being the ultimate production of a uniform mixture of acid derivatives not dependent upon the location of the double bond in the olefin starting material.

A still further object of this invention is to provide a process for isomerizing the double bond in terminal and non-terminal olefins containing six or more carbon atoms.

And a still further object of this invention is the provision of a process for metalating alkenes containing at least six carbon atoms by starting with an excess of alkene and recycling the excess which is an isomeric mixture of the alkene starting material wherein the double bonds are predominantly located either in the $\alpha$- or $\beta$-position or—if the alkene starting material contains a double bond more internal than $\Delta^{2,3}$—in a position enhancing the probability that the double bonds will be predominantly located in either the $\alpha$- or $\beta$-position after further recycling.

It has now been discovered that terminal and non-terminal olefins having six or more carbon atoms can be metalated by alkyl potassium, rubidium and cesium metalating agents to yield a mixture of alkenyl metalated derivatives having metal substituents on either the 1- or 3-positions of the alkenyl chain. This mixture can be readily converted by carbonation and acidification to a mixture of 1- and 3-substituted monocarboxylic acids. Thus, for example,

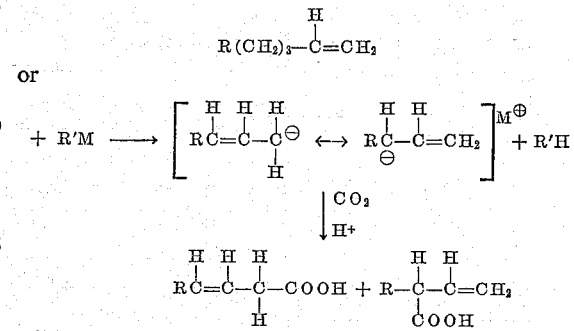

wherein R is an alkyl chain having from one to about 22 carbon atoms such that the olefin starting material contains at least six but not more than 25 carbon atoms, R' is an alkyl chain having one to about 12 carbon atoms and M is an alkali metal selected from the group consisting of potassium, rubidium and cesium.

The instant invention is based on the following discovery: (a) certain alkyl potassium, rubidium and cesium compounds react with a terminal olefin to give alkenyl alkali metal intermediates which can be readily carbonated to give a mixture of 1- and 3-substituted monocarboxylic acids; (b) the olefin material recovered from the reaction mixture of (a) is a mixture of $\alpha$- and $\beta$-olefins, the double bond having undergone slow isomerization to the $\Delta^{2,3}$ position only; and (c) when a non-terminal olefin starting material having the double bond in a position more internal than $\Delta^{2,3}$ is employed, the double bond tends to migrate during the metalation reaction with the alkyl potassium, rubidium or cesium compound toward the terminal position and does not thereafter isomerize to a position more internal than $\Delta^{2,3}$. The double bond is more stable in the $\Delta^{2,3}$ position than it is in the terminal position but it metalates in either of these two positions to form a terminal allylic carbanion. The terminal allylic carbanions are readily converted to valuable derivatives, e.g., carboxylic acids by carbonation and acidification. The terminology "terminal allylic carbanion" is used herein to describe a carbanion having its negative charge smeared over the three terminal carbon atoms due to allylic resonance stabilization, that is,

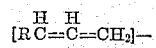

wherein R is the balance of the alkene chain.

As is more fully explained in co-pending application Serial No. 187,198, filed concurrently herewith and now abandoned, the metalation of a non-terminal olefin starting material with an alkyl sodium compound causes the double bond in the olefin starting material to migrate to all possible isomeric positions. For example, the metalation of 2-dodecene with amyl sodium produces alkenyl organosodium compounds which can be carbonated to give a mixture of 1- and 3-substituted monocarboxylic acids. The olefin material recovered from the reaction mixture has undergone double bond migration to all possible straight-chain isomeric positions. When amyl potassium, rubidium or cesium is substituted for the amyl sodium in the above reaction, it has been discovered that the olefin recovered from the reaction mixture is composed only of 1- and 2-dodecene. This limited bond migration in the olefin starting material is particularly advantageous and desirable since it provides a method for directly converting terminal olefins to highly useful β-olefins without obtaining at the same time olefins which are more internal. Moreover, as is most readily seen when the olefin starting material is more internal than $\Delta^{2,3}$, the olefin undergoes more rapid metalation when the metalating agent is alkyl potassium, rubidium or cesium rather than alkyl sodium. In this instance, the double bond in the olefin starting material tends to migrate toward the terminal allylic carbanion position rather than away from it. This is shown by the following data relating to double bond isomerization obtained from the reaction of 5-dodecene with amyl potassium followed by carbonation and acidification as more fully described hereinafter and in Example I.

TABLE I

| Contact time | Analysis for $C_{13}$ acids* | Double bond distribution (percent) | | | | | |
|---|---|---|---|---|---|---|---|
| | | α | $\Delta^{2,3}$ | $\Delta^{3,4}$ | $\Delta^{4,5}$ | $\Delta^{5,6}$ | $\Delta^{6,7}$ |
| 0 | Positive | | | | | | 100 |
| 30 min | do | | 3 | 2 | 2 | 3 | 90 |
| 1 hr | do | <1 | 4 | 3 | 3 | 5 | 85 |
| 24 hrs | do | <1 | 12 | 8 | 7 | 12 | 60 |
| 100 hrs | do | 1 | 21 | 14 | 14 | 20 | 30 |

*3-tridecenoic and α-vinyl undecanoic acids. The conversion of the metalated products to $C_{13}$ acids is employed to evidence by chemical means the formation of the 1- and 3-substituted metalated products (3-potassio-1-dodecene and 1-potassio-2-dodecene).

It has been determined that the double bond is not only isomerized toward the terminal allylic carbanion position but that the double bond does not thereafter remigrate to a position more internal than $\Delta^{2,3}$. Thus, when an olefin more internal than $\Delta^{2,3}$ is subjected to metalation, excess starting material can be recycled and thereafter metalated at a more efficient rate than the initial olefin due to the isomerization of the double bond.

Any terminal or non-terminal aliphatic monoolefin having six or more carbon atoms can be employed as a reactant in the present invention. Such olefins contain from six to about twenty-five carbon atoms including, for example, hexene-1, -2, and -3, the heptenes, octenes, etc., up to and including 12-pentacosene. A particularly preferred range includes olefin compounds having ten or more carbon atoms but less than about twenty carbon atoms. Propylene, the butenes and pentenes are not included within the scope of this invention since the olefin starting material must contain at least six carbon atoms before the advantages and objects of this invention attendant to controlled double bond migration can be realized.

The metalating agent employed is an akyl potassium, alkyl rubidium or alkyl cesium compound or mixture thereof. Thus, a suitable reactant can consist of an alkyl potassium and alkyl cesium mixture wherein the alkyl groups are preferably but not necessarily of equal chain lengths. For example, a mixture of alkyl groups derived from coconut fatty alcohol can be employed. Included in an illustrative and representative group of suitable metalating agents are potassium, rubidium and cesium compounds having methyl, butyl, secondary and tertiary butyl, amyl, octyl, and dodecyl alkyl groups. The alkyl alkali metal compounds can be produced by methods well known in the art, for example, by reacting one mole of the alkyl halide with two moles of the alkali metal dispersed is a saturated hydrocarbon solvent. Specifically, amyl chloride is reacted with a potassium metal dispersion in n-octane to produce amyl potassium.

In the present process, the metalation reaction is carried out by reacting the olefin and the metalating agent at a temperature below about 30° C. but preferably below about 20° C. since certain metalating agents begin to decompose rather than react with the olefin at temperatures greater than about room temperature. Substantially lower temperatures below about 0° C. can be used, a highly satisfactory and most preferred range being between about —25° C. and 20° C.

No specially added reaction medium is generally required for the process embodied herein. The instant process contemplates, especially in its preferred aspects, the use of an excess of olefin starting material (preferably at least two moles of olefin per mole of metalating agent) and such excess is generally sufficient to act as a reaction medium and thereby make the addition of another component such as a saturated hydrocarbon reaction medium, unnecessary. If desired, liquid alkanes such as pentane, octane and decane can, however, be employed as reaction media in limited amounts up to an amount sufficient to produce a 50% alkali metal dispersion. Any so-called inert additives should be free of impurities which would react with either the alkyl alkali metal reactant or the alkenyl alkali metal derivatives produced by the instant process and thus form undersirable by-products.

The alkenyl alkali metal derivatives prepared in accordance with the instant invention are versatile intermediates and can be isolated as such, but preferably they are directly and immediately upon preparation converted to valuable derivatives, for example, to a mixture of 1- and 3-substituted monocarboxylic acids or soap salts which are useful surface active agents and lubricants. If desired, the carboxylic acid mixture formed by carbonation of the metal derivatives and isolated by acidification can be separated by distillation to yield the 1-substituted and 3-substituted monocarboxylic acids in their isolated forms. The carboxylic acid mixtures can be conviently produced, for example, by subjecting the alkenyl alkali metal derivative to contact with dry gaseous carbon dioxide, with solid carbon dioxide or by treating the derivatives with $CO_2$ in an inert liquid followed by treatment with a mineral acid.

In addition to carbonation to form a carboxylic acid mixture, the metalated derivatives can be subjected to other reactions with electrophilic reagents such as $SO_2$ and $SO_3$ to produce sulfinic acids and sulfonic acids respectively; with N-haloamines to produce amines; with epoxides to produce alcohols; with aldehydes to produce secondary alcohols; with ketones to produce tertiary alcohols; with halobenzenes to produce alkylated benzene; and with α,β unsaturated esters to produce both monomeric and polymeric condensation products. These compounds are all highly useful starting materials for the preparation of surface active agents, for example, the amines are readily oxidized to form amine oxides.

The instant metalation reaction can be carried out as a batch process or in a continuous or semi-continuous fashion. With olefins more internal than $\Delta^{2,3}$, operation in a continuous or semi-continuous fashion is particularly advantageous. A purified olefin added to a reaction mixture undergoes isomerization of the double bond while the initial excess of starting material is being metalated to alkenyl alkali metal products. Thereafter, in its isomerized condition, the added material is more readily converted to the metalated products and their valuable derivatives. The instant process also provides a method for obtaining a uniform product mixture of 1- and 3-substituted derivatives from crude or unpurified olefin starting material containing isomeric olefins, for example, n-dodecene containing 1-dodecene, 2-dodecene, 3-dodecene, 4-dodecene and 5-dodecene.

The following examples illustrate the process of this invention. There are, of course, modifications of these embodiments which can be made by those skilled in the art without departing from the scope of this invention as defined in the appended claims.

*Example I.—2-dodecene+n-butyl potassium*

7.8 grams of potassium metal (0.2 mole) were placed in 200 milliliters of octane in a creased three-necked round-bottom flask. The potassium dispersion was heated at atmospheric pressure to the reflux point of octane (124° C.) and stirred rapidly for three minutes. After cooling the dispersion to 0° C., 9.2 grams (0.1 mole) of n-butyl chloride were added dropwise with rapid stirring to form equimolar amounts of n-butyl potassium and n-butane. The mixture was stirred for 30 minutes after addition was complete; whereupon to the mixture 67.2 grams (0.4 mole) of 2-dodecene were added. This reaction mixture was allowed to stir for 3 hours at 20° C. before carbonation was effected by pouring over excess solid carbon dioxide. 30 milliliters of t-butyl alcohol was added to dissipate any unreacted metal and 100 milliliters of water were then introduced to dissolve all the precipitated salts. The organic and water layers were separated and washed repeatedly with water and pentane respectively. The washed water layer was acidified with dilute hydrochloric acid and extracted with diethyl ether. The ether solution was dried with magnesium sulfate, filtered, and evaporated to yield a mixture of 3-tridecenoic acid and α-vinyl undecanoic acid. Fractional distillation of the organic layer provided octane and a mixture of 1- and 2-dodecene.

Characterization of the carboxylic acid products was accomplished by vapor phase chromatographic separation of the unsaturated methyl esters obtained by diazomethane esterification of the acids, followed by nuclear magnetic resonance and infrared spectral studies. Additionally the unsaturated esters were hydrogenated, using 10 percent palladium on charcoal catalyst, and the saturated analogs compared gas chromatographically with alternately synthesized standards. The characterization of the acid products showed that the alkenyl potassium products which were carbonated were 3-potassio-1-dodecene and 1-potassio-2-dodecene. By employing the procedure outlined above, a mixture of 3-potassio-1-dodecene and 1-potassio-2-dodecene was produced and reacted with acetaldehyde at room temperature to produce a mixture of 2-hydroxy-3-vinyldodecene and 2-hydroxy-4-tetradecene.

*Example II.—2-dodecene+n-butyl cesium*

1.9 grams of cesium metal (0.014 mole) were placed in 30 milliliters of octane in an Erlenmeyer flask under an argon atmosphere. 30 milliliters of 15 percent butyl lithium in hexane were added and the reaction mixture stirred for 24 hours at room temperature to form n-butyl cesium and n-butane. After this interval, 32.6 grams (0.2 mole) of 2-dodecene were added to this mixture and stirring was continued for one hour to form 3-cesio-1-dodecene and 1-cesio-2-dodecene. Carbonation and work up as described in Example I provided a mixture of 3-tridecenoic and α-vinyl undecanoic acids, octane, and dodecene. The dodecene contained no isomers in which the double bond is located more internal than the 2-position.

Characterization of products was accomplished as described in Example I.

*Example III.—2-dodecene+n-butyl rubidium*

1.5 grams of rubidium metal (0.017 mole) were placed in 30 milliliters of octane in an Erlenmeyer flask under an argon atmosphere. 30 milliliters of 15 percent butyl lithium in hexane were added and the reaction mixture stirred for 48 hours at room temperature to form n-butyl rubidium and n-butane. After this interval, 32.6 grams (0.2 mole) of 2-dodecene were added to this mixture and stirring was continued for one hour to form 3-rubidio-1-dodecene and 1-rubidio-2-dodecene. Carbonation and work up as described in Example I provided a mixture of 3-tridecenoic and α-vinyl undecanoic acids, octane, and dodecene. The dodecene contained no isomers in which the double bond is located more internal than the 2-position.

Characterization of products was accomplished as described in Example I.

*Example IV.—1-dodecene+octyl potassium*

A reaction of 1-dodecene with octyl potassium was run, worked up, and products characterized in a manner analogous to that described in Example I. The acid product consisted of a mixture of 3-tridecenoic acid and α-vinyl undecanoic acid. The recovered dodecene was composed of 80 percent 1-dodecene and 20 percent 2-dodecene.

Analogous reaction, except that the reaction mixture of 1-dodecene and octyl potassium was stirred for 18 hours rather than the 3 hour period of Example I, was run. The recovered olefin in this case consisted of 65 percent 1-dodecene and 35 percent 2-dodecene.

The starting material recovered from the above reaction mixtures is shown to have undergone a slow isomerization to the $\Delta^{2,3}$ position only. Data obtained for the reaction of 1-dodecene with octyl potassium for varying periods of contact time up to 240 hours prior to carbonation are tabulated below. Analysis of the double bond position was made by oxidation of the double bond position to the corresponding acid fragments, esterification of the acids, and vapor phase chromatographic analysis of the esters. In all instances, the $C_{13}$ acid products were 3-tridecenoic acid and α-vinyl undecanoic acid.

TABLE II

| Contact time | Analysis for $C_{13}$ acids | Double bond distribution (percent) | | |
|---|---|---|---|---|
| | | α | $\Delta^{2,3}$ | $>\Delta^{2,3}$ |
| ½ hour | Positive | 90 | 10 | 0 |
| 1 hour | do | 85 | 15 | 0 |
| 4 hours | do | 80 | 20 | 0 |
| 18 hours | do | 65 | 35 | 0 |
| 42 hours | do | 50 | 50 | 0 |
| 240 hours | do | 30 | 70 | 0 |

*Example V*

$$1\text{-}dodecene + \begin{matrix} methyl\ cesium \\ methyl\ rubidium \end{matrix}$$

In a reaction carried out in the manner analogous to that described in Example II, but in which 30 milliliters of 15 percent methyl lithium in hexane were used in place of the 30 milliliters of 15 percent butyl lithium in hexane, 1-dodecene was reacted with methyl cesium. The products were found to be the same $C_{13}$ acids obtained in Example II. Similarly, the metalation of 1-dodecene with methyl rubidium was carried out in a manner essentially analogous to that described in Example III except that 30 milliliters of 15 percent methyl lithium was substituted for the butyl lithium. By contacting the organorubidium compounds with dry gaseous carbon dioxide, 3-tridecenoic acid and α-vinyl undecanoic acid were produced.

*Example VI*

$$5\text{-}dodecene + \begin{matrix} amyl\ potassium \\ amyl\ rubidium \\ amyl\ cesium \end{matrix}$$

A reaction of 5-dodecene with amyl potassium was run and characterized in the manner analogous to that described in Example I. It was found that terminal derivatives, i.e., 3-tridecenoic acid and α-vinyl undecanoic acid were produced upon carbonation after stirring for only 1 hour. Amyl rubidium and amyl cesium in analogous reactions produced the same $C_{13}$ acids with 5-dodecene after stirring for only ½ hour.

Recovery and analysis as in Example III of the double bond in the starting material reacted with amyl potassium is given hereinbefore in Table I.

Example VII

The following reactions can be carried out by the general procedure given in Example I using the indicated reactants to obtain the 1- and 3-substituted acids identified above in Table III. The position of the double bond in the unmetalated excess of starting material is also reported. In each reaction, conversion of the metalation products to the reported carboxylic acids has been utilized to evidence by chemical means the formation of the corresponding 1- and 3-substituted metalated products.

Many apparently widely different embodiments of the process of this invention may be made without departing from the scope and spirit thereof. It is to be understood that this invention is not limited to the specific embodiments set forth herein and that only such limitations may be imposed on the appended claims as are stated therein.

What is claimed is:

1. A process for isomerizing a straight chain terminal monoolefin having from six to about 25 carbon atoms which comprises reacting a molar excess of said monoolefin at a temperature between about $-25°$ C. and about 30° C. with an alkyl alkali metal compound selected from the group consisting of alkyl potassium, alkyl rubidium and alkyl cesium compounds containing from one to about twelve carbon atoms and recovering from the reaction mixture the unmetalated excess of said monoolefin which is isomerized to the $\alpha$- and $\beta$-positions.

2. The process set forth in claim 1 wherein the straight chain terminal monoolefin is 1-dodecene.

TABLE III

| Moles of olefin | Reaction temperature, °C. | Moles of metalating agent | Reaction time | Acids | Double bond distribution (percent) | | | | | | | | | | | | |
|---|---|---|---|---|---|---|---|---|---|---|---|---|---|---|---|---|---|
| | | | | | $\alpha$ | $\Delta^{2,3}$ | $\Delta^{3,4}$ | $\Delta^{4,5}$ | $\Delta^{5,6}$ | $\Delta^{6,7}$ | $\Delta^{7,8}$ | $\Delta^{8,9}$ | $\Delta^{9,10}$ | $\Delta^{10,11}$ | $\Delta^{11,12}$ | $\Delta^{12,13}$ | $\Delta^{13,14}$ |
| (a) 4 moles 1-hexene | −25 | 1 mole dodecyl potassium. | 10 min | 3-heptenoic and $\alpha$-vinyl pentanoic. | 95 | 5 | | | | | | | | | | | |
| | −20 | do | 30 min | do | 94 | 6 | | | | | | | | | | | |
| | −10 | do | 1 hr | do | 90 | 10 | | | | | | | | | | | |
| | 0 | do | 130 hrs | do | 20 | 80 | | | | | | | | | | | |
| (b) 4 moles 3-hexene | 0 | 1 mole amyl cesium. | 30 min | 3-heptenoic and $\alpha$-vinyl pentanoic. | 1 | 8 | 90 | | | | | | | | | | |
| | 0 | do | 12 hrs | do | 1 | 59 | 40 | | | | | | | | | | |
| (c) 3 moles 1-octene | −20 | 1 mole amyl potassium. | 1 hr | 3-nonenoic and $\alpha$-vinyl heptanoic. | 91 | 9 | | | | | | | | | | | |
| | +20 | do | 24 hrs | do | 40 | 60 | | | | | | | | | | | |
| (d) 2 moles 4-octene | +20 | 1 mole amyl potassium. | 1 hr | 3-nonenoic and $\alpha$-vinyl heptanoic. | 1 | 9 | 5 | 85 | | | | | | | | | |
| | 0 | do | 24 hrs | do | 1 | 35 | 36 | 28 | | | | | | | | | |
| (e) 5 moles 4-hexadecene. | +20 | 1 mole n-butyl rubidium. | 30 min | 3-heptadecenoic and $\alpha$-vinyl pentadecanoic. | 1 | 8 | 6 | 80 | 5 | | | | | | | | |
| | +20 | do | 24 hrs | do | 1 | 16 | 14 | 20 | 13 | 14 | 12 | 10 | | | | | |
| (f) 4 moles 8-octadecene. | +20 | 1 mole n-butyl cesium. | 30 min | 3-nonadecenoic and $\alpha$-vinyl heptadecanoic. | 1 | 12 | 10 | 9 | 4 | 2 | 3 | 60 | | | | | |
| | +20 | do | 24 hrs | do | 1 | 16 | 14 | 12 | 13 | 14 | 10 | 20 | | | | | |
| (g) 4 moles 11-tricosene. | +20 | 1 mole amyl cesium. | 30 min | 3-tetracosenoic and $\alpha$-vinyl docosanoic. | 1 | 4 | 1 | 1 | 1 | 1 | 1 | 1 | 2 | 2 | 3 | 4 | 78 |
| | +20 | do | 24 hrs | do | 1 | 7 | 2 | 3 | 3 | 4 | 5 | 6 | 6 | 7 | 7 | 8 | 40 |

References Cited by the Examiner

UNITED STATES PATENTS 2,454,082  11/48  Morton _____ 260—533
2,804,489  8/57  Pines et al. _____ 260—683.2

OTHER REFERENCES

Harwood, The Industrial Chemist, pp. 30–34 (Jan. 1960).

Morton et al., Journal of American Chemical Society, vol. 67, pp. 2224–28 (1945).

Morton et al., Journal of American Chemical Society, vol. 72, pp. 3785–92 (1950).

Morton et al., "J. Organic Chem.," 1955, vol. 20, pp. 839–844.

ALPHONSO D. SULLIVAN, *Primary Examiner.*

LEON ZITVER, *Examiner.*